(12) United States Patent
Nones

(10) Patent No.: X4096
(45) Date of Patent: Apr. 28, 1825

(54) NANKEEN, MAKING, YELLOW & BUFF

(76) Inventor: Joseph B. Nones

Joseph B. Jones,
Letters Patent, No.

The Schedule referred to in these Letters Patent & making part of the same; containing a description in the words of the said Joseph B. Jones himself, of his Improvement, being a Receipt for making permanent "Yellow Nankeen or Buff Colors."

Mode of preparing the Cloth or Stuffs for Coloring. — Take the cloth in the bleached or brown state, or the ingredients for making the cloth in the manufactured thread or raw state, and having washed it well in hot water and with common brown soap, rinse it well with hot water and let it soak in it over night. in the morning take it out and let it partially dry in the shade. it is then fit for coloring.

To make coloring matter for one hundred pieces Yellow or Buff Nankeens, of seven yards in length. Boil in a Copper Boiler, with fifty gallons of Spring water 8 lbs. Gum Kino, and 2 lbs. [illegible] (in a linen bag) and let them boil for six hours, and in another boiler with fifty gallons Spring water, boil in a bag 60 lbs. Shumac, (or 2 lbs. Gall nuts). 2 lbs. Alum, which boil for the space of six hours also. When done take the liquids from both Coppers and mix them together and let them stand till luke warm. Then dye your cloths or stuffs in it for the space of ten minutes. Then take them out and wash them in acidulated water, very weak, of the Sulphuric Acid, from which take the cloths or stuffs, and pass them through clear Spring water and let them drain, and let them dry in the shade. An addition of Shumac and a little acid turns the colors more yellow, and the addition of Kino more red. — practice and the eye is the best possible guide. — The adding of a little common lye to the Coloring matter, will give a grayish appearance to the goods. The Colors produced by this Solution, will be fast and immovable by Acids, or soaps and may justly be termed indelible.

To make the yellow or Buff Nankeen, as per sample sent the Department of the cloth of my [illegible] is dyed by

United States Patent

Patent No.: X4096 the foregoing process, dried, extended, and put in form.

Rec'd 15th May, 1866.

Witness,
John Dunn
J. B. Y. Bree

Joseph W. Jones.
Philad'a 11th April, 1866.